(12) United States Patent
Gum et al.

(10) Patent No.: US 8,334,806 B2
(45) Date of Patent: Dec. 18, 2012

(54) METHODS AND APPARATUSES FOR RESPONDING TO A REQUEST FOR SATELLITE POSITIONING SYSTEM RELATED INFORMATION ASSOCIATED WITH A MOBILE STATION

(75) Inventors: Arnold Jason Gum, San Diego, CA (US); Douglas Neal Rowitch, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 321 days.

(21) Appl. No.: 12/580,165

(22) Filed: Oct. 15, 2009

(65) Prior Publication Data

US 2011/0090115 A1    Apr. 21, 2011

(51) Int. Cl.
G01S 19/25    (2010.01)
G01S 19/34    (2010.01)
(52) U.S. Cl. .............................. 342/357.64; 342/357.74
(58) Field of Classification Search ............. 342/357.22, 342/357.42, 357.43, 357.64, 357.74
See application file for complete search history.

(56) References Cited

U.S. PATENT DOCUMENTS

2005/0228589 A1* 10/2005 Diggelen et al. .................. 702/1
2008/0068257 A1*  3/2008 Mizuochi ................. 342/357.01
2009/0278738 A1* 11/2009 Gopinath ................. 342/357.12
2010/0309044 A1* 12/2010 Ische et al. .............. 342/357.28

FOREIGN PATENT DOCUMENTS

EP         1773024         4/2007

OTHER PUBLICATIONS

International Search Report and Written Opinion—PCT/US2010/052903—International Search Authority, European Patent Office, Feb. 4, 2011.

* cited by examiner

*Primary Examiner* — Jack W Keith
*Assistant Examiner* — Fred H Mull
(74) *Attorney, Agent, or Firm* — Jimmy Cheng; Arnold J. Gum (57) ABSTRACT

Methods and apparatuses are provided which may be used in mobile stations to perform or otherwise support location services. Signals representing existing SPS-related information associated with the mobile station can be stored during a MS-based or a standalone GNSS tracking session. In response to a request for an MS-assisted location session, the existing SPS-related information can be compared to a threshold. Signals representing the requested SPS-related information can be generated based on the existing SPS-related information and stored in memory.

39 Claims, 3 Drawing Sheets

METHODS AND APPARATUSES FOR RESPONDING TO A REQUEST FOR SATELLITE POSITIONING SYSTEM RELATED INFORMATION ASSOCIATED WITH A MOBILE STATION

BACKGROUND

1. Field

The subject matter disclosed herein relates to electronic devices, and more particularly to methods and apparatuses for use in and/or with mobile station devices.

2. Information

Wireless communication systems are fast becoming one of the most prevalent technologies in the digital information arena. Satellite and cellular telephone services and other like wireless communication networks may already span the entire globe. Additionally, new wireless systems (e.g., networks) of various types and sizes are added each day to provide connectivity among a plethora of devices, both fixed and portable. Many of these wireless systems are coupled together through other communication systems and resources to promote even more communication and sharing of information.

Another popular and increasingly important wireless technology includes navigation systems and in particular satellite positioning systems (SPS's) such as, for example, the global positioning system (GPS) and other Global Navigation Satellite Systems (GNSS's). SPS enabled devices, for example, may receive wireless SPS signals that are transmitted by a plurality of SPS satellites and/or positioning signals that are transmitted by terrestrial based transmitting devices. The SPS signals may, for example, be processed to determine a global time, a range or pseudorange, an approximate or accurate geographical location, altitude, and/or speed of the SPS enabled device. Consequently, various location sessions may be supported, at least in part, using an SPS enabled device.

SUMMARY

In accordance with certain aspects of the present description, techniques are provided which may be implemented through various methods and apparatuses for use in a mobile station to support location sessions associated therewith which are based, at least in part, on SPS signals.

By way of example but not limitation, in certain implementations a method may be implemented which includes, as part of a first location session, storing one or more digital signals in a memory of the mobile station representing existing SPS-related information associated with the mobile station. The method may also include, in response to one or more digital signals representing a request for SPS-related information associated with a second location session, determining whether the existing SPS-related information satisfies at least one threshold parameter. If so, then the method may include, generating one or more digital signals representing the requested SPS-related information associated with the second location session based, at least in part, on the existing SPS-related information, and storing such requested SPS-related information in the memory. The method may also include pre-emption of the second location session by the first location session when the requested SPS-related information associated with the second location session can be adequately provided by the first location session.

In certain other example implementations, if the existing SPS-related information does not satisfy at least one threshold parameter then the method may include generating one or more digital signals representing the requested SPS-related information based, at least in part, on one or more subsequently received SPS signals, and storing such requested SPS-related information in the memory. The method may also include pre-emption of the first location session by the second location session and resumption of the first location session once the second location session is complete.

In certain example implementations, the stored requested SPS-related information may be provided to a requesting entity. In certain instances, a requesting entity may include a second location session provided within the mobile station. In other examples, the request for SPS-related information associated with the second location session may be received by the mobile station.

In certain example implementations, at least one of the first or second location sessions may include a location based service (LBS). In certain example implementations, one or both of the first or second location sessions may be operatively enabled, at least in part, using at least one computing device external to the mobile station.

In certain example implementations, existing SPS-related information and/or the requested SPS-related information may include at least one of: a pseudorange, a pseudorange rate, timing information, frequency information, state information, and/or a current position fix. In certain example implementations, requested SPS-related information may include an estimated current position fix based, at least in part, on the existing SPS-related information. In certain example implementations, requested SPS-related information may include an estimated current position fix based, at least in part, on new SPS-related information (e.g., one or more subsequently received SPS signals).

In certain example implementations, a threshold parameter may be associated with an acceptable/unacceptable time uncertainty of the existing SPS-related information, an acceptable/unacceptable position uncertainty of the existing SPS-related information, and/or an acceptable/unacceptable number of visible satellites.

In certain example implementations, the existing SPS-related information and/or the requested SPS-related information may be associated with at least one GNSS, at least one pseudolite, at least one wireless communication network transmitting device, and/or other like SPS resource.

BRIEF DESCRIPTION OF DRAWINGS

Non-limiting and non-exhaustive aspects are described with reference to the following figures, wherein like reference numerals refer to like parts throughout the various figures unless otherwise specified.

DETAILED DESCRIPTION

Certain electronic devices, such as, a mobile station (MS), may be capable of providing and/or otherwise supporting one or more location session(s) (e.g., location based services, and/or the like) based, at least in part, on having acquired and processed satellite positioning system (SPS) signals. A mobile station can be, at least part of, at least one wireless communication network transmitting device.

As described in greater detail in subsequent sections, as used herein an MS may take on a variety of different forms and may include devices such as an SPS receiver, a wireless communication network interface, and other circuitry that may be capable of supporting at least one location session and/or other like positioning, navigation, ranging, and/or computing/communication processes based, at least in part, on SPS-related information.

Also as described in greater detail in subsequent sections, as used herein an SPS may include a variety of like or different types of systems, devices, processes, etc., that are capable of providing and/or otherwise supporting in some manner a location session associated with an MS. By way of example but not limitation, in certain example implementations an SPS may include one or more global navigation satellite systems (GNSS), such as, the Global Positioning System (GPS) having a plurality of satellite vehicles (SVs), and/or one or more terrestrial based networks/devices such as pseudolites, which transmit SPS signals that may be acquired by an MS.

As used herein, a location session may include any process in which an MS may be involved, that in some manner is based, at least in part, on SPS-related information associated with at least one SPS signal acquired by the MS. In certain example implementations, a location session may include a position/navigation capability that is provided by an MS based on locally maintained SPS-related information. In certain other example implementations, a location session may include a position/navigation capability that is provided in part by one or more other devices with assistance from an MS based, at least in part, on SPS-related information that may be communicated between the MS and the one or more other devices. In certain example implementations, a location session may include a location based service (LBS), such as, for example, E911, navigation, friend finder, etc.

Accordingly, in certain example situations, two or more location session applications may be performed at the same time. For example, a network computing device may initiate transmission of one or more messages to an MS, such as, e.g., an MS-Assisted location request, to which the MS may respond. Here, for example, an MS may respond by determining and providing certain requested SPS-related information to the network computing device. Such a request may, however, be received while an MS is performing and/or otherwise supporting another location session. For example, an MS may be performing a navigation-related MS-based or standalone GNSS tracking session when a request associated with an MS-assisted location session is received. To handle such potentially conflicting location session requests without interrupting the pre-existing location session, an MS may, for example, use location information from a current or pre-existing MS-Based or Standalone SPS tracking session to provide an acceptable location response for the MS-Assisted request. In certain instances, for example, efficiency may be increased by reducing or eliminating the need for a separate SPS search.

In accordance with certain aspects of the present description, it is recognized that in certain situations SPS-related information previously established (existing SPS-related information) by a first location session may be useful in some manner to a second location session. By way of example but not limitation, a first location session location session may utilize an MS-based location session and a second location session may utilize an MS-assisted location session. In certain examples, a first location session may have SPS state information available prior to the start of a second location session. In other examples, a second location session may interrupt or attempt to interrupt in some manner (e.g., pause, halt, prematurely end, etc.) a first location session. In still other examples, an MS may be capable of supporting a second location session without interrupting and/or otherwise significantly impacting operation of an existing first location session.

In accordance with certain aspects of the present description, it is recognized that certain inefficiencies may exist if, for example, an MS-based tracking or standalone SPS session are interrupted by an MS-Assisted location request initiated from another device or by the MS locally. By way of example, with such interruption it may be that in certain implementations the MS would stop the MS-based tracking session and likely discard the state information (e.g., associated with a Kalman-Filter), and start the MS-Assisted fix from scratch by taking all new measurements using available SPS signals. Hence, this may be inefficient both in terms of time and accuracy. Furthermore, it is recognized that an on-going or recent MS-Based and/or standalone tracking session may have already established sufficiently reliable SPS-related information (e.g., including state information). Indeed, in certain implementations, such existing SPS-related information may provide improved location accuracy over a single MS-Assisted session due to the ongoing state information as well as associated predictive information.

As such, in certain example implementations, rather than ignoring and/or discarding existing SPS-related information (e.g., tracking session information, state information, etc.) and/or fully initiating the requested MS-Assisted session, methods and apparatuses may be implemented which take advantage of such existing information that is determined to be sufficiently accurate. Here, for example, existing SPS-related information may be used to quickly establish and provide the requested MS-Assisted information (e.g., measurements, etc.) back to the requesting device/service. Thus, for example, in certain implementations existing SPS-related information may be used to quickly provide SV pseudorange or other like information, and/or current/predicted position information as calculated based, at least in part, on the state of a Kalman-Filter or the like associated with a recent or ongoing MS-based/standalone navigation process. In certain implementations, the state of a Kalman-Filter may include other non-SPS location information sources such as, but not limited to, information from accelerometers, magnetometers, odometers and altimeters. Thus, in certain implementations, a Kalman-Filter or the like may continue to operate as part of an MS-based/standalone location session while requested MS-assisted location session information is provided.

In certain example implementations, therefore, an MS may obtain existing SPS-related information and determine whether the existing SPS-related information satisfies at least one threshold parameter. If the existing SPS-related information satisfies the threshold parameter, then the MS may establish, as needed, the requested SPS-related information based, at least in part, on the existing SPS-related information. All or part of the requested SPS-related information may then be stored in a memory and/or provided/sent to a requesting entity, as appropriate.

In certain example implementations, if the existing SPS-related information does not satisfy one or more threshold parameters, then requested SPS-related information may be established by the MS based, at least in part, on one or more subsequently received SPS signals. This resulting requested SPS-related information may then be stored in memory and/or provided/sent to a requesting entity, as appropriate.

Existing SPS-related information may, for example, be associated with a first location session and the requested SPS-related information may be associated with and used by a second location session. One or both of first or second location sessions may, for example, utilize an MS-based, Standalone GPS and/or MS-Assisted mode of location determination. If the second location session uses an MS-based mode of location determination, for example, then the second location session may obtain requested SPS-related information directly or indirectly from memory. If the second location session uses an MS-assisted mode of location determination, for example, then the second location session may obtain requested SPS-related information through one or more received messages transmitted by the MS to one or more other devices (e.g., network devices) over a wireless communication link.

In certain example implementations, an MS may obtain existing SPS-related information in response to one or more requests for an SPS-related information response. Here, for example, a request for updated SPS-related information may be internally generated within an MS (e.g., wherein a second location session is MS-based or standalone) or may be received by an MS (e.g., wherein a second location session is MS-assisted).

In certain example implementations, at least a portion of existing SPS-related information and/or requested SPS-related information may comprise pseudorange information, pseudorange rate information, time and/or timing information, frequency information, state information, a current position fix, and/or other like information related to the location/position of the MS.

In certain example implementations, a threshold parameter may be associated with a measurement of either an acceptable time or an unacceptable time uncertainty. For example, a threshold parameter may test or otherwise verify that an "age" of the existing SPS-related information falls within an acceptable range. Here, for example, it may be that existing SPS-related information is reliable enough provided it has an age not greater than an "X" amount of time.

In certain example implementations, a threshold parameter may be associated with a measurement of either an acceptable position uncertainty or an unacceptable position uncertainty. For example, a threshold parameter may test or otherwise verify that a "position" related to the MS and the existing SPS-related information falls within an acceptable range. Here, for example, it may be that existing SPS-related information is reliable enough provided it has an error estimated to be not greater than a "Y" error or other like measurement. Here, for example, it may be that existing SPS-related information is reliable enough provided that other information (e.g., non-SPS sensor information) remains within an acceptable range. For example, an MS may include one or more sensors such as non-SPS sensors capable of indicating movement or lack of movement of the MS.

In certain other example implementations, a threshold parameter may be associated with a measurement of either an acceptable number of visible satellites or an unacceptable number of visible satellites. For example, a threshold parameter may test or otherwise verify that enough satellites were visible to calculate an SPS fix or if an MS-Assisted hybrid fix may be beneficial to take advantage of network ranging or other like resources.

Figure 1:
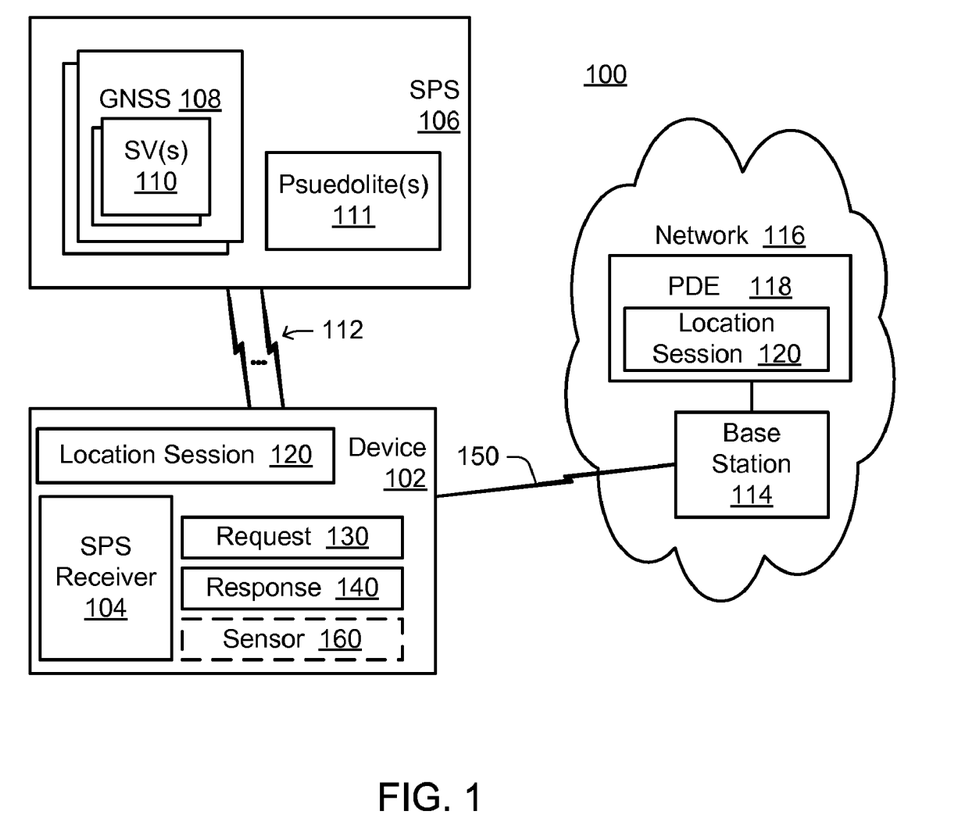
FIG. 1 is a schematic block diagram illustrating an exemplary signaling environment that includes at least one device capable of supporting, at least in part, one or more location sessions based on SPS-related information, in accordance with an implementation.

Reference is now made to FIG. 1, which is a schematic block diagram illustrating an exemplary signaling environment 100 that includes at least one device 102 capable of supporting, at least in part, one or more location sessions 120 based on SPS-related information, in accordance with an example implementation.

Environment 100 may include various computing and communication resources capable of providing at least some form of location session with regard to device 102 based, at least in part, on one or more SPS signals 112 from SPS 106. Here, for example, device 102 may comprise an MS that is also capable of communicating with one or more resources within a wireless communication network 116 over one or more wireless communication links 150.

By way of example but not limitation, device 102 may include a mobile station such as a cellular phone, a smart phone, a personal digital assistant, a portable computing device, a navigation unit, and/or the like or any combination thereof. In other example implementations, device 102 may take the form of one or more integrated circuits, circuit boards, and/or the like that may be operatively enabled for use in another device.

Device 102 may, for example, be enabled for use with various wireless communication networks such as a wireless wide area network (WWAN), a wireless local area network (WLAN), a wireless personal area network (WPAN), a network including femtocells, and so on. The terms "network" and "system" may be used interchangeably herein. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, Long Term Evolution (LTE), and so on. A CDMA network may implement one or more radio access technologies (RATs) such as cdma2000, Wideband-CDMA (W-CDMA), to name just a few radio technologies. Here, cdma2000 may include technologies implemented according to IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may include an IEEE 802.11x network, and a WPAN may include a Bluetooth network, an IEEE 802.15x network, or some other type of network. The techniques described herein may be implemented in conjunction with any combination of WWAN, WLAN and/or WPAN, including networks with femtocells.

As illustrated in the example in FIG. 1, SPS 106 may, for example, include one or more GNSS 108, each of which may include a different plurality of SVs 110 that may transmit different SPS signals 112. As illustrated, SPS 106 may, for example, include one or more pseudolites 111 and/or other like transmitting devices that may transmit certain SPS signals 112.

As illustrated in the example in FIG. 1, wireless communication network 116 may include one or more transmitting devices such as base station 114, and/or a location server 118 (e.g., a position determination entity (PDE), and/or the like). Here, for example, location server 118 may provide and/or otherwise support one or more location sessions 120. Also, as illustrated in the example in FIG. 1, device 102 may provide and/or otherwise support one or more location sessions 120. Thus, one or more communication/messaging protocols may be provided through which a location session 120 in location server 118 may communicate with a location session 120 in device 102. By way of example, as shown in device 102, a request 130 associated with a location session may be received or otherwise obtained by device 102, and response 140 associated with request 130 may be stored and/or otherwise transmitted by device 102. Here, for example, request 130 may be indicate a desire by a location session for certain updated SPS-related information relating to device 102 and response 140 may be based, at least in part, on such updated SPS-related information. In certain example implementations, device 102 may include one or more sensors 160, which may provide information relating to position, movement, direction of travel, altitude, etc., and requested SPS-related information is at least partially derived using information from at least one non-SPS sensor.

Techniques described herein may be used with an "SPS" which may include one or more systems of transmitters positioned to enable entities to determine (estimate) their location on or above the Earth based, at least in part, on signals received from the transmitters. Such a transmitter typically transmits a signal marked with a repeating pseudo-random noise (PN) code of a set number of chips and may be located on ground based control stations, user equipment and/or space vehicles. In a particular example, such transmitters may be located on Earth orbiting satellite vehicles (SVs). For example, an SV in a constellation of Global Navigation Satellite System (GNSS) such as Global Positioning System (GPS), Galileo, Glonass or Compass may transmit a signal marked with a PN code that is distinguishable from PN codes transmitted by other SVs in the constellation. In accordance with certain aspects, the techniques presented herein are not restricted to global systems (e.g., GNSS) for SPS. For example, the techniques provided herein may be applied to or otherwise enabled for use in various regional systems, such as, e.g., Quasi-Zenith Satellite System (QZSS) over Japan, Indian Regional Navigational Satellite System (IRNSS) over India, Beidou over China, etc., and/or various augmentation systems (e.g., an Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Such SBAS may, for example, transmit SPS and/or SPS-like signals that may also be interfered with by certain wireless communication signals, etc. Thus, as used herein an SPS may include any combination of one or more global and/or regional navigation satellite systems and/or augmentation systems, and SPS signals may include SPS, SPS-like, and/or other signals associated with such one or more SPS.

As such, such techniques may be used with an "SPS" that includes positioning systems that utilize pseudolites or a combination of SVs and pseudolites. Pseudolites 111 may, for example, include ground-based transmitters that broadcast a PN code or other ranging code (e.g., similar to a GPS or CDMA cellular signal). Such a transmitter may be assigned a unique PN code so as to permit identification by a remote receiver. Pseudolites may be useful, for example, to augment an SPS in situations where SPS signals from an SV might be unavailable, such as in tunnels, mines, buildings, urban canyons or other enclosed areas. Another implementation of pseudolites is known as radio-beacons. The term "SV", as used herein, is intended to include pseudolites, equivalents of pseudolites, and possibly others. The terms "SPS signals", as used herein, is intended to include SPS-like signals from pseudolites or equivalents of pseudolites.

With this in mind and in accordance with certain aspects, some exemplary methods and apparatuses will now be described, which may be implemented in one or more devices, such as device 102, to support, at least in part, one or more location sessions based on SPS-related information.

Figure 2:
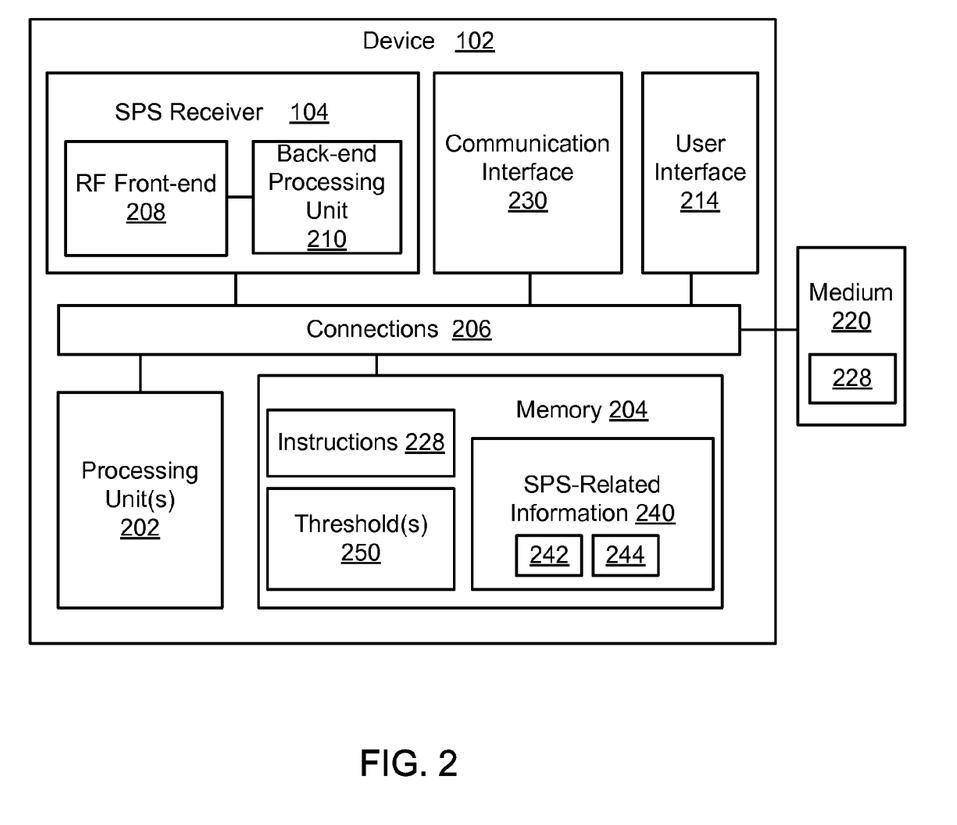
FIG. 2 is a schematic block diagram illustrating certain features of an exemplary device, for example as in FIG. 1, capable of supporting, at least in part, one or more location sessions based on SPS-related information, in accordance with an implementation.

As illustrated in the exemplary schematic block diagram of FIG. 2, in certain example implementations, device 102 may include SPS receiver 104 capable of receiving an RF signal that includes at least one SPS signal 112. SPS receiver 104 may include, for example, RF front-end circuit 208 coupled to back-end processing unit 210. In certain example implementations, SPS receiver 104 may provide all or part of SPS-related information 240, shown here as stored in memory 204. In certain example implementations, one or more processing units 202 may be coupled to SPS receiver 104 and provide all or part of SPS-related information 240. In certain example implementations, SPS receiver 104 and/or processing unit(s) 202 may be enabled to establish all or part of SPS-related information 240 in support of one or more location sessions 120 (FIG. 1) in response to instructions 228, which may be stored in memory 204.

As illustrated in FIG. 2, in certain example implementations, SPS-related information 240 may comprise existing SPS-related information 242 and/or updated/requested SPS-related information 244. Also, as shown, one or more threshold parameters 250 may be stored in memory 204.

As illustrated in FIG. 2 an article of manufacture represented here by a computer readable medium 220 may be provided and accessed by processing unit 202, for example. As such, in certain example implementations, the methods and/or apparatuses may take the form in whole or part of a computer readable medium 220 that may include computer implementable instructions 228 stored thereon, which if executed by at least one processing unit or other like circuitry are enabled to enable the processing unit(s) 202 and/or other like circuitry to perform all or portions of a location session(s) and/or supporting techniques/processes as presented in the examples herein. In certain implementations, a processing unit used for SPS calculations may be enabled to perform or support other functions, such as communication, etc.

Processing unit(s) 202 may be implemented in hardware or a combination of hardware and software. Processing unit(s) 202 may be representative of one or more circuits configurable to perform at least a portion of a data computing procedure or process. By way of example but not limitation, processing unit(s) 202 may include one or more processors, controllers, microprocessors, microcontrollers, application specific integrated circuits (ASICs), digital signal processors, programmable logic devices, field programmable gate arrays, and the like, or any combination thereof.

Memory 204 may be representative of any data storage mechanism. Memory 204 may include, for example, a primary memory and/or a secondary memory. Primary memory may include, for example, a random access memory, read only memory, etc. While illustrated in this example as being separate from processing unit(s) 202, it should be understood that all or part of a primary memory may be provided within or otherwise co-located/coupled with processing unit(s) 202. Secondary memory may include, for example, the same or similar type of memory as primary memory and/or one or more data storage devices or systems, such as, for example, a disk drive, an optical disc drive, a tape drive, a solid state memory drive, etc. In certain implementations, secondary memory may be operatively receptive of, or otherwise configurable to couple to, computer readable medium 220.

As further illustrated in FIG. 2, device 102 may include one or more connections 206 (e.g., buses, lines, conductors, fibers, etc.) to operatively couple the various circuits together, and a user interface 214 (e.g., display, touch screen, keypad, buttons, knobs, microphone, speaker, etc.) to receive user input and/or provide information to the user. Device 102 may include a communication interface 230 (e.g., wireless transceiver, modem, antenna, etc.) to allow for communication with one or more other devices over a wireless communication link (e.g., link 150 in FIG. 1).

Figure 3:
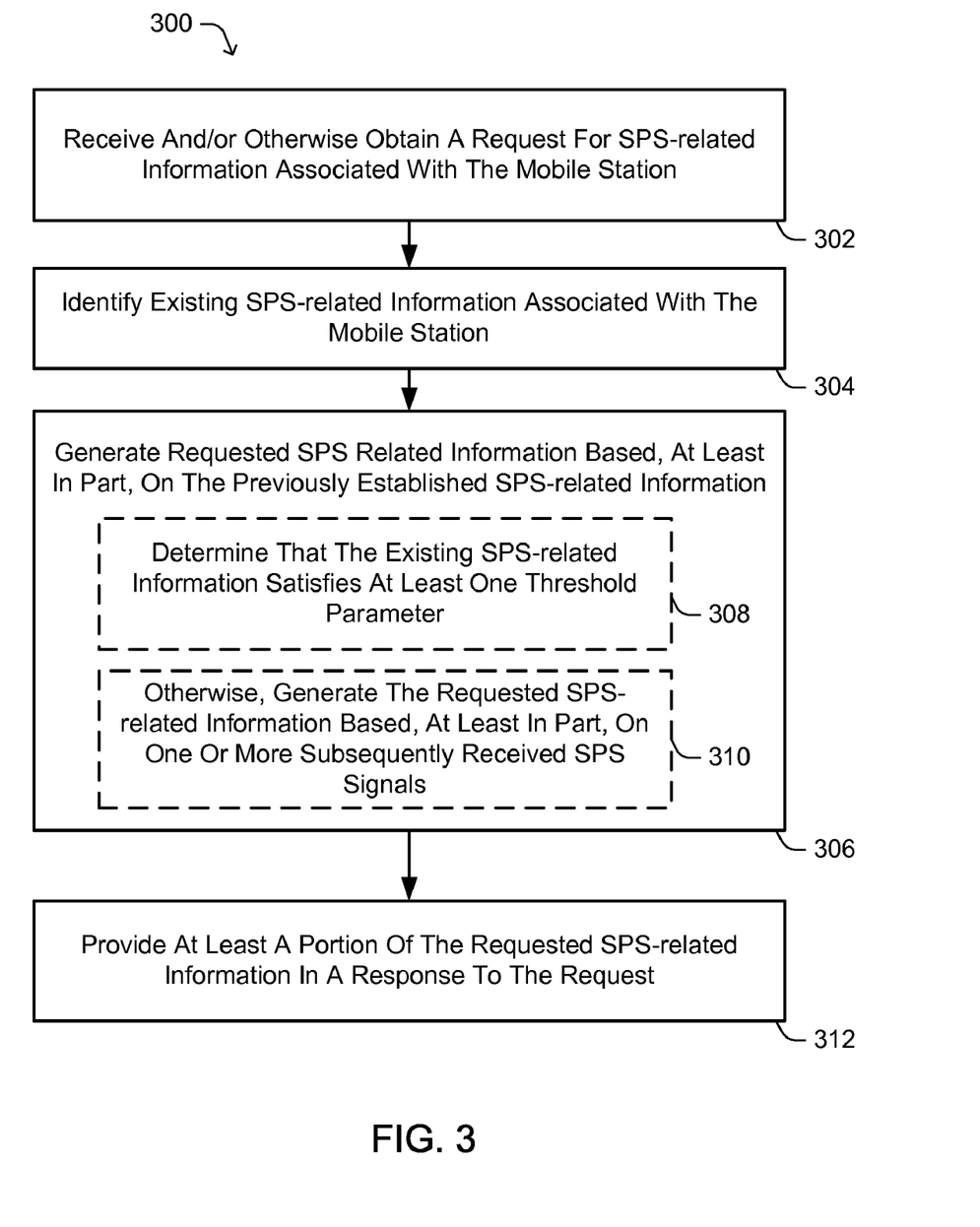
FIG. 3 is a flow diagram illustrating an example process for supporting, at least in part, one or more location sessions based on SPS-related information, in accordance with an implementation

Reference is made next to FIG. 3 with the examples of FIGS. 1 and 2 in mind. Flow diagram 300 illustrates an example process for supporting, at least in part, one or more location sessions 120 based on SPS-related information 240, in accordance with an implementation. Here, in this example, device 102 comprises an MS.

At block 302, a request 130 for SPS-related information 244 associated with the MS may be received and/or otherwise obtained. At block 304, existing SPS-related information 242 associated with the MS may be identified, for example, as being stored in memory 204.

At block 306, requested SPS-related information 244 may be generated or otherwise identified based, at least in part, on the existing SPS-related information 242. By way of example, in certain implementations, as part of block 306, as shown at block 308, it may first be determined that existing SPS-related information 242 satisfies at least one threshold parameter 250. In certain further example implementations, as part of block 306, as shown at block 310, if it is determined that existing SPS-related information 242 fails to satisfy threshold parameter 250 then the requested SPS-related information 244 may be generated based, at least in part, on one or more subsequently received SPS signals. At block 312, requested SPS-related information 244 may be provided in some manner in a response 140 to request 130.

Those skilled in the art will further recognize that, in accordance with certain aspects, the methods and apparatuses provided herein may be implemented to allow a device to maintain an ongoing location/tracking session, such as, a navigation session (e.g., using a standalone or MS-based mode of calculation) and still handle an external location request associated with an MS-Assisted mode of calculation without having to interfere with the existing MS-based/standalone location/tracking session. As such, for example, such a device may be enabled to satisfy an external location request without interfering with a car navigation or other like ongoing process.

Reference throughout this specification to "one example", "an example", "certain examples", or "exemplary implementation" means that a particular feature, structure, or characteristic described in connection with the feature and/or example may be included in at least one feature and/or example of claimed subject matter. Thus, the appearances of the phrase "in one example", "an example", "in certain examples" or "in certain implementations" or other like phrases in various places throughout this specification are not necessarily all referring to the same feature, example, and/or limitation. Furthermore, the particular features, structures, or characteristics may be combined in one or more examples and/or features.

As used herein, a mobile station (MS) refers to a device such as a cellular or other wireless communication device, personal communication system (PCS) device, personal navigation device (PND), Personal Information Manager (PIM), Personal Digital Assistant (PDA), laptop or other suitable mobile device which is capable of receiving wireless communication and/or navigation signals. The term "mobile station" is also intended to include devices which communicate with a personal navigation device (PND), such as by short-range wireless, infrared, wireline connection, or other connection—regardless of whether satellite signal reception, assistance data reception, and/or position-related processing occurs at the device or at the PND. Also, "mobile station" is intended to include all devices, including wireless communication devices, computers, laptops, etc. which are capable of communication with a server, such as via the Internet, Wi-Fi, or other network, and regardless of whether satellite signal reception, assistance data reception, and/or position-related processing occurs at the device, at a server, or at another device associated with the network. Any operable combination of the above are also considered a "mobile station."

The methodologies described herein may be implemented by various means depending upon the application. For example, these methodologies may be implemented in hardware, firmware, software, or any combination thereof. For an implementation involving hardware, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For an implementation involving firmware and/or software, the methodologies may be implemented with modules (e.g., procedures, functions, and so on) that perform the functions described herein. Any machine-readable medium tangibly embodying instructions may be used in implementing the methodologies described herein. For example, software codes may be stored in a memory and executed by a processor unit. Memory may be implemented within the processor unit or external to the processor unit. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a computer-readable medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer-readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

Some portions of the preceding detailed description have been presented in terms of algorithms or symbolic representations of operations on and/or generation of binary/digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, information, or the like. It should be understood, however, that all of these or similar terms are to be associated with appropriate physical quantities and are merely convenient labels. Unless specifically stated otherwise, as apparent from the preceding discussion, it is appreciated that throughout this specification discussions utilizing terms such as "processing," "computing," "calculating," "determining", "establishing", "obtaining", and/or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device. In the context of this particular patent application, the term "specific apparatus" or the like may include a general purpose computer once it is programmed to perform particular functions pursuant to instructions from program software.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein.

Therefore, it is intended that claimed subject matter not be limited to the particular examples disclosed, but that such claimed subject matter may also include all aspects falling within the scope of appended claims, and equivalents thereof.

What is claimed is:

1. A method for use in a mobile station, the method comprising:
   as part of a first location session, storing one or more signals in a memory of the mobile station representing existing SPS-related information associated with the mobile station, wherein the first location session is a MS-based or a standalone GNSS tracking session; and
   in response to one or more signals representing a request for SPS-related information associated with a second location session, wherein the second location session is a MS-assisted location session:
   determining whether said existing SPS-related information satisfies at least one threshold parameter, and if so:
   generating one or more signals representing said requested SPS-related information based, at least in part, on said existing SPS-related information, and
   storing said one or more signals representing said requested SPS-related information in said memory.

2. The method as recited in claim 1, wherein said request for SPS-related information associated with said second location session is received by the mobile station.

3. The method as recited in claim 1, wherein at least one of said first or second location session comprises a location based service (LBS).

4. The method as recited in claim 1, wherein at least one of said first or second location session is operatively enabled, at least in part, using at least one computing device external to the mobile station.

5. The method as recited in claim 1, wherein at least a portion of at least one of said existing SPS-related information and/or said requested SPS-related information comprises at least one of: a pseudorange, a pseudorange rate, timing information, frequency information, state information, and/or a current position fix.

6. The method as recited in claim 1, wherein said at least one threshold parameter is associated with either an acceptable time uncertainty or an unacceptable time uncertainty of said existing SPS-related information.

7. The method as recited in claim 1, wherein said at least one threshold parameter is associated with either an acceptable position uncertainty or an unacceptable position uncertainty of said existing SPS-related information.

8. The method as recited in claim 1, wherein said at least one threshold parameter is associated with either an acceptable number of visible satellites or an unacceptable number of visible satellites.

9. The method as recited in claim 1, further comprising:
   if said existing SPS-related information does not satisfy the at least one threshold parameter:
   generating said one or more signals representing said requested SPS-related information based, at least in part, on one or more subsequently received SPS signals, and
   storing said one or more signals representing said requested SPS-related information in said memory.

10. The method as recited in claim 9, wherein generating said one or more signals representing said requested SPS-related information comprises estimating a current position fix based, at least in part, on said one or more subsequently received SPS signals.

11. The method as recited in claim 1, wherein at least one of said existing SPS-related information and/or said requested SPS-related information is associated with the mobile station as part of at least one or at least one wireless communication network transmitting device.

12. The method as recited in claim 1, wherein said requested SPS-related information is at least partially derived using information from at least one non-SPS sensor.

13. An apparatus for use in a mobile station, the apparatus comprising:
   memory having stored therein one or more signals representing existing SPS-related information associated with a first location session, wherein the first location session is a MS-based or a standalone GNSS tracking session; and
   at least one processing unit coupled to said memory and programmed with instructions to:
   in response to one or more signals representing a request for SPS-related information associated with a second location session, wherein the second location session is a MS-assisted location session:
   determine whether said existing SPS-related information satisfies at least one threshold parameter, and if so:
   generate one or more signals representing said requested SPS-related information based, at least in part, on said existing SPS-related information; and
   store said one or more signals representing said requested SPS-related information in said memory.

14. The apparatus as recited in claim 13, further comprising:
   a communication interface coupled to at least one of said memory and/or said processing unit, said communication interface to receive said request for SPS-related information associated with said second location session.

15. The apparatus as recited in claim 13, further comprising:
   a SPS receiver coupled to at least one of said memory and/or said processing unit, and wherein at least one of said first or second location sessions is operatively enabled, at least in part, using said SPS receiver.

16. The apparatus as recited in claim 13, wherein at least one of said first or second location sessions comprises a location based service (LBS).

17. The apparatus as recited in claim 13, wherein at least one of said first or second location sessions is operatively enabled, at least in part, using at least one computing device external to the mobile station.

18. The apparatus as recited in claim 13, wherein at least a portion of at least one of said existing SPS-related information and/or said requested SPS-related information comprises at least one of: a pseudorange, a pseudorange rate, timing information, frequency information, state information, and/or a current position fix.

19. The apparatus as recited in claim 13, wherein said at least one threshold parameter is associated with either an acceptable time uncertainty or an unacceptable time uncertainty of said existing SPS-related information.

20. The apparatus as recited in claim 13, wherein said at least one threshold parameter is associated with either an acceptable position uncertainty or an unacceptable position uncertainty of said existing SPS-related information.

21. The apparatus as recited in claim 13, wherein said at least one threshold parameter is associated with either an acceptable number of visible satellites or an unacceptable number of visible satellites.

22. The apparatus as recited in claim 13, wherein said one or more signals representing said requested SPS-related information comprises a current position fix based, at least in part, on said existing SPS-related information.

23. The apparatus as recited in claim 13, wherein said one or more signals representing said requested SPS-related information comprises a current position fix based, at least in part, on non-SPS sensor-related information.

24. The apparatus as recited in claim 13, further comprising:
   a communication interface coupled to at least one of said memory and/or said processing unit, said communication interface to transmit at least a portion of said requested SPS-related information.

25. The apparatus as recited in claim 13, wherein if said existing SPS-related information does not satisfy said at least one threshold parameter, said at least one processing unit is programmed with instructions to:
   generate said one or more signals representing said requested SPS-related information based, at least in part, on one or more subsequently received SPS signals.

26. The apparatus as recited in claim 13, wherein at least one of said existing SPS-related information and/or said requested SPS-related information is associated with an SPS comprising at least one of at least one pseudolite and/or at least one wireless communication network transmitting device.

27. An article comprising:
   a computer readable medium having computer implementable instructions stored thereon which if implemented by one or more processing units in a mobile station enable the mobile station to:
   store one or more signals in a memory of the mobile station representing existing SPS-related information associated with the mobile station as part of a first location session, wherein the first location session is a MS-based or a standalone GNSS tracking session; and
   determine whether said existing SPS-related information satisfies at least one threshold parameter in response to one or more signals representing a request for SPS-related information associated with a second location session, wherein the second location session is a MS-assisted location session, and if so:
   generate one or more signals representing said requested SPS-related information associated with said second location session based, at least in part, on said existing SPS-related information; and
   store said one or more signals representing said requested SPS-related information in said memory.

28. The article as recited in claim 27, wherein said request for SPS-related information associated with said second location session is received by the mobile station.

29. The article as recited in claim 27, wherein at least one of said first or second location sessions is operatively enabled, at least in part, using an SPS receiver of the mobile station.

30. The article as recited in claim 27, wherein at least one of said first or second location sessions comprises a location based service (LBS).

31. The article as recited in claim 27, wherein at least one of said first or second location sessions is operatively enabled, at least in part, using at least one computing device external to the mobile station.

32. The article as recited in claim 27, wherein at least a portion of at least one of said existing SPS-related information and/or said requested SPS-related information comprises at least one of: a pseudorange, a pseudorange rate, timing information, frequency information, state information, and/or a current position fix.

33. The article as recited in claim 27, wherein said at least one threshold parameter is associated with either an acceptable time uncertainty or an unacceptable time uncertainty of said existing SPS-related information.

34. The article as recited in claim 27, wherein said at least one threshold parameter is associated with either an acceptable position uncertainty or an unacceptable position uncertainty of said existing SPS-related information.

35. The article as recited in claim 27, wherein said at least one threshold parameter is associated with either an acceptable number of visible satellites or an unacceptable number of visible satellites.

36. The article as recited in claim 27, further comprising computer implementable instructions, which if implemented by said one or more processing units, enable the mobile station to estimate a current position fix based, at least in part, on said existing SPS-related information.

37. The article as recited in claim 27, further comprising computer implementable instructions, which if implemented by said one or more processing units, enable the mobile station to:
- if said existing SPS-related information does not satisfy said at least one threshold parameter:
- generate said one or more signals representing said requested SPS-related information based, at least in part, on one or more subsequently received SPS signals, and
- store said one or more signals representing said requested SPS-related information in said memory.

38. The article as recited in claim 27, wherein at least one of said existing SPS-related information and/or said requested SPS-related information is associated with an SPS comprising at least one of at least one pseudolite and/or at least one wireless communication network transmitting device.

39. The article as recited in claim 27, wherein said mobile station comprises at least a CDMA communication interface.

* * * * *